2,698,804

METHOD OF PRESERVING LETTUCE

Samuel L. Crisafulli and Carmelo Crisafulli, Oswego, N. Y.

No Drawing. Application April 13, 1951, Serial No. 220,979

7 Claims. (Cl. 99—156)

This invention relates to a process for treating and packaging lettuce, as well as other leafy vegetables.

It is well known that when lettuce is brought into contact with ice, it becomes what is known as "ice burned." It is also well known that when lettuce is shipped for long distances, such as on trips requiring five or more days, it will become wilted when no ice is used for its preservation, and when lettuce is subjected to cold temperatures, it has a tendency to discolor, particularly at the butt end, as well as in the leaves. All of this renders lettuce which has become wilted or discolored objectionable for sale purposes, and wilting and discoloration result in considerable unsalability as well as very large economic losses.

We have found that when lettuce is treated in accordance with the process of our invention, not only is discoloration of the lettuce greatly reduced and ice burns avoided, but the lettuce has the additional advantage of retaining its fresh and crisp appearance. Our improved method of treating lettuce and other leafy vegetables is, therefore, of great importance, both to growers and shippers of lettuce and other leafy vegetables, particularly where great distances of shipment are involved.

In carrying out our process, after the lettuce has been cut, we first immerse the lettuce in a treating solution. For best purposes, we have found an aqueous solution containing one-tenth of one percent of sodium benzoate, or one-tenth of one percent of potassium nitrate, or a compound mixture of sodium benzoate and potassium nitrate is particularly suitable. When a compound mixture of sodium benzoate and potassium nitrate is employed, the total of these two ingredients in the aqueous solution should be one-tenth of one percent.

The two treatment agents, sodium benzoate and potassium nitrate, may be used either individually or together, and the limitations specified are to be kept within the official legal limits of these two particular chemicals when applied to food stuffs. The concentration of the solutions given are based on weight of the sodium benzoate and potassium nitrate to volume of water and the resulting solution, i. e., all solutions are to be made by the weight to volume method. Hereinafter the term "treatment solution" refers to anyone of the above mentioned solutions in these exact percentages, as stated.

The amounts of these chemicals, sodium benzoate and potassium nitrate, may vary within wide amounts depending on legal limits already set up or subsequent regulations to be enacted. Our invention has been tested utilizing amounts varying from one-one hundredth of one percent in the solution up to one-half of one percent solution, these being the amounts of sodium benzoate and potassium nitrate.

The temperature of the treatment solution must be controlled and maintained as near to the freezing point of these solutions as possible, and the solution should be kept in a liquid state. This is the most advantageous and ideal temperature for practicing our invention. However, the temperature of the treatment solution can be as high as 40 degrees F. and nearly the same results secured.

The lettuce, or other leafy vegetable, after being cut, is immersed in this cold treatment solution. After being first dipped in the solution, as explained, the treatment serves to prolong and retard discoloration or wilting of the lettuce, inhibiting bacteria growth associated with decay and commonly associated with leafy vegetables after cutting. The lettuce is then removed from the solution and the head immediately packaged in a container, either of waxed paper, "Pliofilm," or other similar impervious packaging material. Ordinarily, we prefer to place each individual lettuce head, after its removal from the treatment solution, in a bag of "Pliofilm." Immediately after its packing in "Pliofilm," the heads of lettuce are packed in a crate container and placed in cold storage of the usual type, ordinarily at a temperature ranging from 31.5 degrees F. upwards to 38 degrees F.

We have found that lettuce, first treated by immersion in our treatment solution, followed by packing in "Pliofilm" and stored under cold storage conditions, retains its fresh appearance, and there is little or no discoloration of the lettuce even after storage for extended periods of time. Also, because our process does not allow the lettuce to come into direct contact with ice, objectionable ice burning to which lettuce is susceptible, is eliminated, all of which renders it more acceptable on the market.

While we have described our invention in its preferred form, it is to be understood that we are not limiting it to such proportions and ingredients as there may be variations and modifications in proportions falling within the scope of our invention and giving equivalent results when used for the treatment of lettuce. Accordingly, such variations and modifications as are within the scope of the appended claims are to be regarded as part of our invention.

We claim:

1. The process of treating lettuce which comprises immersing the lettuce in cold distilled water containing a treatment agent selected from the group which consists of potassium nitrate and sodium benzoate said solution being at a temperature within the range of solution freezing point to 40 degrees F.

2. The process of treating fresh lettuce which comprises immersing said lettuce in an aqueous solution of a treatment agent selected from the group which consists of ture within the range of the solution freezing point to 40 degrees F., said chemical compound being present in said solution in an amount varying from one-one hundredth of one percent into the solution up to one-half of one percent solution.

3. The process of treating fresh lettuce which comprises immersing said lettuce in an aqueous solution containing a treatment agent selected from the group which consists of potassium nitrate and sodium benzoate said solution being at a temperature within the range of 32.5 degrees F. to 40 degrees F. and then packaging said lettuce in impervious packaging material.

4. The process of treating fresh lettuce to the action of an aqueous solution containing a treatment agent selected from the group which consists of potassium nitrate and sodium benzoate, said solution being at a relatively low temperature approximately equivalent to the freezing point of the solution, packaging said lettuce in impervious packaging material and then storing said lettuce under conditions of cold storage.

5. The process of treating fresh lettuce which comprises subjecting said lettuce to the action of a solution containing a treatment agent selected from the group which consists of potassium nitrate and sodium benzoate, said solution containing an amount less than one-one hundredth of one percent in the solution up to one-half of one percent solution, said treatment being carried out when said solution is at a temperature within the range of solution freezing point to 40 degrees F.

6. In a process for treating fresh lettuce, the step which comprises subjecting said lettuce to the action of a cold aqueous solution of a treatment agent selected from the group which consists of sodium benzoate or potassium nitrate, said solution being at a temperature within the range of the solution freezing point to 40 degrees F.

7. The process which comprises subjecting fresh lettuce to the action of an aqueous solution, containing a treatment agent selected from the group which consists of potassium nitrate and sodium benzoate, each being present in amounts not exceeding one-one hundredth of one percent to one-half of one percent based on the weight of the solution, said treatment being carried out at a temperature within the range of the solution freezing point to 40 degrees F.

References Cited in the file of this patent

UNITED STATES PATENTS

| | | |
|---|---|---|
| 1,018,812 | Dujardin | Feb. 27, 1912 |
| 2,168,651 | McCoy | Aug. 8, 1939 |
| 2,322,493 | Wilson | June 22, 1943 |
| 2,453,040 | Sharma | Nov. 2, 1948 |

OTHER REFERENCES

Scientific Preservation of Food, by Rector, pages 139 and 157 (1925).